United States Patent
Doherty

(10) Patent No.: US 8,165,563 B2
(45) Date of Patent: Apr. 24, 2012

(54) FRAUD DETECTION SYSTEM

(75) Inventor: Ross Doherty, Newbury (GB)

(73) Assignee: Vodafone Group PLC, Newbury, Berkshire (GB)

( * ) Notice: Subject to any disclaimer, the term of this patent is extended or adjusted under 35 U.S.C. 154(b) by 370 days.

(21) Appl. No.: 12/311,196

(22) PCT Filed: Sep. 20, 2007

(86) PCT No.: PCT/GB2007/003603
§ 371 (c)(1),
(2), (4) Date: Jun. 25, 2009

(87) PCT Pub. No.: WO2008/035100
PCT Pub. Date: Mar. 27, 2008

(65) Prior Publication Data
US 2009/0280777 A1 Nov. 12, 2009

(30) Foreign Application Priority Data

Sep. 21, 2006 (GB) ................................ 0618627.4
Oct. 11, 2006 (GB) ................................ 0620221.2

(51) Int. Cl.
*H04M 1/66* (2006.01)
*H04M 3/42* (2006.01)
(52) U.S. Cl. .................. 455/410; 455/415; 455/414.1
(58) Field of Classification Search .............. 455/415, 455/414.1, 410, 411, 406, 432.1, 558, 433, 455/435.1; 707/3, 104.1; 713/182, 168; 705/73; 709/206; 379/114.14
See application file for complete search history.

(56) References Cited

U.S. PATENT DOCUMENTS

| | | | |
|---|---|---|---|
| 5,999,807 A | 12/1999 | Kaplan et al. | |
| 6,185,416 B1 | 2/2001 | Rudokas et al. | |
| 2003/0028526 A1* | 2/2003 | Fitzpatrick et al. | 707/3 |
| 2004/0236702 A1 | 11/2004 | Fink et al. | |
| 2004/0254890 A1 | 12/2004 | Sancho et al. | |
| 2004/0266415 A1* | 12/2004 | Belkin et al. | 455/415 |
| 2005/0039036 A1 | 2/2005 | Eisen | |
| 2005/0278542 A1* | 12/2005 | Pierson et al. | 713/182 |
| 2006/0269050 A1 | 11/2006 | Yezhuvath et al. | |
| 2007/0025534 A1 | 2/2007 | Yezhuvath et al. | |
| 2007/0072587 A1 | 3/2007 | Della-Torre | |

FOREIGN PATENT DOCUMENTS

| | | |
|---|---|---|
| GB | 2 366 699 A | 3/2002 |
| GB | 2409300 A | 6/2005 |
| WO | WO 96/31043 | 10/1996 |
| WO | WO 2004/034685 A1 | 4/2004 |
| WO | WO 2007/135656 A1 | 11/2007 |

* cited by examiner

*Primary Examiner* — Kiet Doan
(74) *Attorney, Agent, or Firm* — Muirhead and Saturnelli, LLC

(57) ABSTRACT

A system for determining associations between subscribers of a communication network include methods and devices for selecting a first subscriber, identifying at least one primary contact of the first subscriber, each primary contact having communicated with the first subscriber, identifying at least one secondary contact of the first subscriber, each secondary contact having communicated with a primary contact, for at least one secondary contact, identifying at least one common contact of the first subscriber and the secondary contact, common contacts having communicated with the first subscriber and the secondary contact, determining the significance of the at least one common contacts and determining an association between the first subscriber and the secondary contact in dependence on the significance of the at least one common contact.

24 Claims, 7 Drawing Sheets

(a)

(b)

(c)

(a)

(b)

FRAUD DETECTION SYSTEM

TECHNICAL FIELD

This application relates to a fraud detection system and, in particular, to a system for detecting fraudulent users within a telecommunication network.

BACKGROUND OF THE INVENTION

Fraudulent use of mobile communication devices costs the industry millions of pounds each year. A particular problem is fraudulent users setting up subscriber accounts in the names of individuals whose identity they have cloned, for example by gaining access to bank details or other confidential or personal information.

One example of fraudulent use is fraudulent subscribers taking out a contract with a mobile network provider under the identity of an unsuspecting third party. Any charges incurred by that fraudulent user, typically, have to be written off by the network. This is particularly expensive for networks when the fraudulent user has incurred large bills either by using heavy talk time or by calling premium rate numbers.

Known fraud detection systems attempt to combat such fraudulent activities by flagging accounts in which talk time or use of premium rate numbers is excessive. While such techniques can identify fraudulent users, many of the subscribers flagged, and hence investigated, are legitimate users. Therefore, such investigations are not always an efficient use of fraud analyst's resources.

Many fraudulent users do not use their accounts for incurring high charges and so are not detected by fraud detection systems which monitor for high usage or expensive calls. Such users may be regular fraudulent users and may be involved with other types of fraudulent activity. Therefore, fraud detection systems should be able to detect fraudulent users who do not show the trends of high volume or expensive usage.

SUMMARY OF THE INVENTION

Embodiments of the system described herein compare the communication profiles of subscribers and look for similar communication patterns which may suggest associations between those subscribers. In particular, embodiments of the system described herein identify common contacts between subscribers and determine the significance of each common contact. Various embodiments of the system described herein consider the popularity of that common contact when determining its significance. The significance of common contact between subscribers are combined to provide a level of association between those subscribers.

Various embodiments of the system described herein calculate a communication profile for a particular subscriber which can be compared with the profiles of further subscribers to identify associations.

Embodiments of the system described herein can be used to compare the communication profiles of known fraudulent users to other subscribers in order to identify association between known fraudulent users and other subscribers.

Further embodiments of the system described herein monitor Subscriber Identity Module (SIM) and International Mobile Equipment Identity (IMEI) data to track devices or SIMs which are used by fraudulent users.

BRIEF DESCRIPTION OF THE DRAWINGS

Embodiments of the system described herein are now explained with reference to the accompanying figures, in which.

DETAILED DESCRIPTION OF VARIOUS EMBODIMENTS

A first embodiment of the invention uses the assertion that communication subscriptions which belong to the same individual or to individuals who are closely associated show similar contact profiles by contacting, and being contacted by, common numbers. Thus, the first embodiment of the invention searches for subscribers showing similar contact profiles. Subscribers need not be mobile communication subscribers but could, instead, have fixed line accounts or an account with another communication provider. In the context of this document, subscriber should be understood to mean a communication contact and they are typically identified, at least initially, by their contact number, for example by MSISDN (for mobile contacts), fixed line telephone number (for fixed line contacts) etc.

Figure 1:
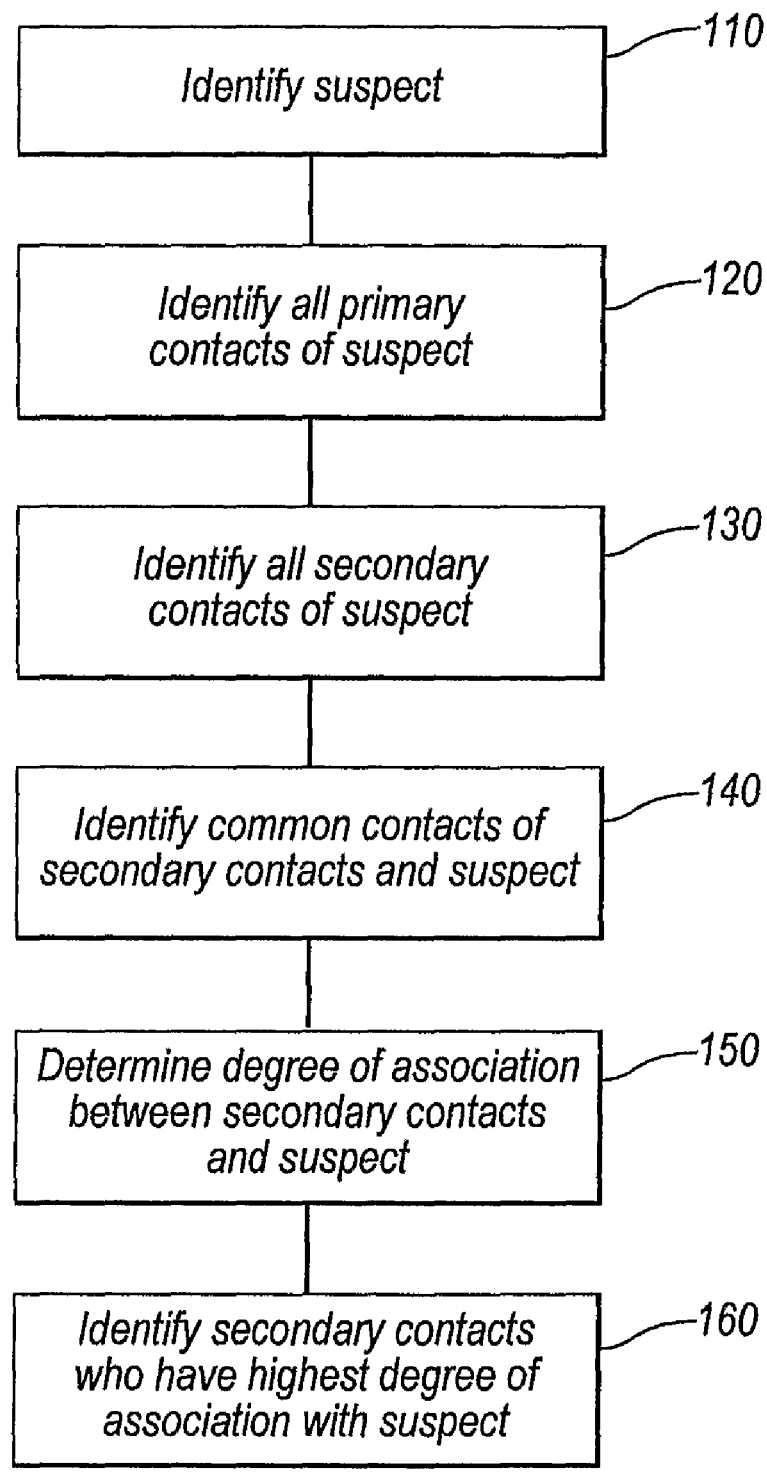
FIG. 1 is a flow diagram showing the overall steps performed by an embodiment of the system described herein to determine a communication profile for a user.

Referring to FIG. 1, a suspect subscriber is selected at 110. Preferably, the subscriber will be identified by its MSISDN. However, different identifiers, for example the IMSI of the SIM, or IMEI of a handset, could be used. The suspect subscriber may be, for example, a MSISDN which has previously been confirmed as being involved in fraudulent activities or a MSISDN which is suspected as being involved in fraudulent activities. At 120 the system interrogates a database containing call records to identify all other subscribers which have been contacted by the suspect and all subscribers which have contacted the suspect. Again, the subscribers will preferably be identified in terms of their MSISDN. These subscribers are referred to as the suspect's primary contacts in the remainder of the document since they have direct contact with the suspect.

Typically, call record databases are compiled by each network and store the details of every communication made from and to all of its subscribers. The call record databases store a record of the subscribers involved in the communication, typically in terms of the MSISDNs or fixed line numbers, and a record of the type of communication, for example voice call, data or SMS. Typically, for calls across a mobile communication network, the records include details of the cell from which the call originated and, in some cases, more accurate data identifying a specific area of the cell. Additionally, for some calls, the cell to which the call was connected is stored. If the call is made to or from a fixed line phone, geographic details of the address at which the fixed line is registered can be obtained. Details of the time and duration of the call are also stored.

On completion of step 120, the system has identified any subscriber who has been in contact with the suspect (primary contacts). In preferred embodiments of the invention the system will identify which party initiated the communication. Further embodiments may also register the number of times that the suspect has communicated with the primary contact. The system may also define a date range over which it wishes to review communications.

Figure 2:
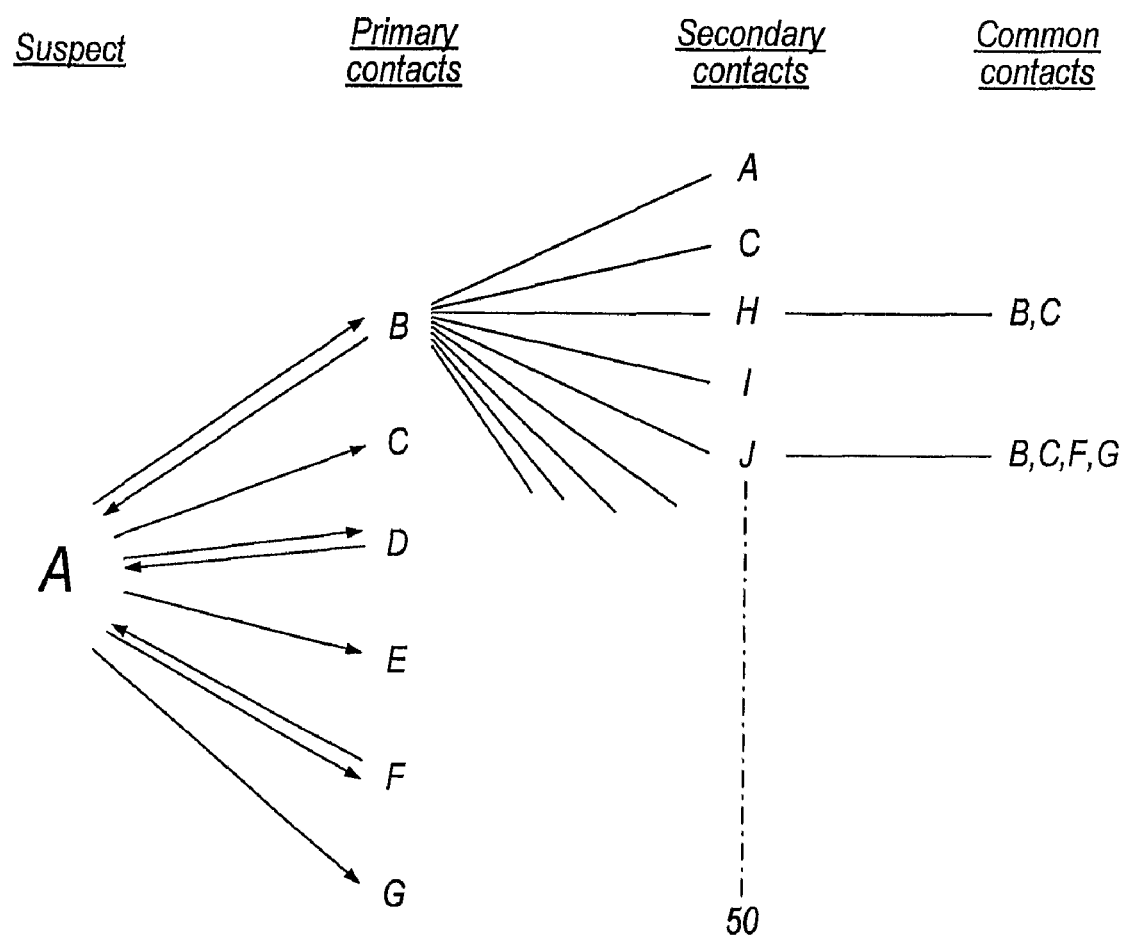
FIG. 2 shows the contacts of a suspect subscriber.

FIG. 2 shows, diagrammatically, the structure of the contact tree from a suspect subscriber A. Such a contact tree could be generated from the data in the call record databases. In FIG. 2, the suspect A has been in contact with primary contacts B, C, D, E, F and G during the time period of interest. The figure also indicates whether the suspect has received or initiated communication with the primary contact (although this is not required by all embodiments). Double lines to a single contact indicate that the suspect has received and initiated communication with that primary contact.

When all primary contacts are identified, the system interrogates the call record database at 130 to determine all communications which have involved the primary contacts. This step is performed by conducting an identical process to that performed when identifying the primary contacts of suspect A for each of the primary contacts. Any subscriber who has communicated with a primary contact is referred to as a secondary contact. Thus, all secondary contacts are associated to the suspect A via at least one primary contact.

In FIG. 2 the secondary contacts which are associated with the suspect A via primary contact B are shown (in practice, a similar tree would be created for each secondary contact). During the time frame of interest, B has had communication with 50 subscribers including A, C, H, I and J.

In the next stage of the association calculation process the system identifies any potentially interesting associations between the secondary contacts and the suspect A. This is performed by determining the level of similarity of communication behavior between the secondary contacts and the suspect A. At 140, the system identifies communications involving each of the secondary contacts in the same way as described above with regard to the suspect and primary contacts and identifies any direct contacts of the secondary contact (i.e. primary contacts of the secondary contacts) which are also primary contacts of the suspect A. Once again, this data is retrieved from the network's call record database. Such contacts are referred to as common contacts in the remainder of this document since they are primary contacts of both the secondary contact and the suspect A.

In FIG. 2, the common contacts of secondary contacts H and J with suspect A are shown. Secondary contact H has two common contacts with suspect A, namely B and C. Secondary contact J has four common contacts with suspect A, namely B, C, F and G. Thus, J has more common contacts with the suspect A than H has with A.

At 150 the system determines the degree of association between the suspect A and each of the secondary contacts. There are several ways in which the degree of association can be quantified. In certain embodiments of the invention the association is quantified by the number of common contacts. In such embodiments, in the example of FIG. 2 the system would determine that secondary contact J is more closely associated with the suspect A than secondary contact H since J has more common contacts with A than A has with H.

Various embodiments of the system described herein include alternative or additional considerations to the number of common contacts when calculating the degree of association. Such embodiments are now described with reference to FIGS. 3-6. These embodiments take into account the popularity (number of primary contacts) of each common contact when calculating the association between subscribers. For example, if one of the common contacts is the short dial code for voicemail then this will be a very popular contact since all subscribers contact voicemail. Therefore, it is unlikely that any useful association information can be inferred from communications with voicemail. In fact, it may be misleading to assume any association between two subscribers who both communicate with a very popular common contact like voicemail. In contrast, if a common contact is not popular and only has, for example, two contacts then those contacts are likely to be closely associated via the common contact.

There are many ways of quantifying the association between contacts. A preferred method is to divide an arbitrary figure by the number of contacts of a common contact in order to evaluate the level of association between subscribers who share that common contact. Table 1 shows the association calculated between subscribers who share common contacts B, C, F or G. In this example, the degree of association is calculated by dividing 10000 (an arbitrary figure) by the number of contacts. As shown in Table 1, B has 50 contacts and so the level of association between subscribers sharing common contact B is 10000/50=200. Common contact C has 10000000 contacts (for example, C could be voice mail) and so the level of association between subscribers sharing common contact C is 10000/10000000=0.001. Thus, the association of subscribers sharing common contact B is much higher than those sharing C and potentially more can be inferred about associations between subscribers sharing B as a common contact from those sharing C.

TABLE 1

Degree of association between subscribers sharing common contacts.

| Common Contact | Total No. Contacts | Degree of association of subscribers sharing common contact |
|---|---|---|
| B | 50 | 200 |
| C | 10,000,000 | 0.001 |
| F | 5 | 2000 |
| G | 25 | 400 |

Figure 3:
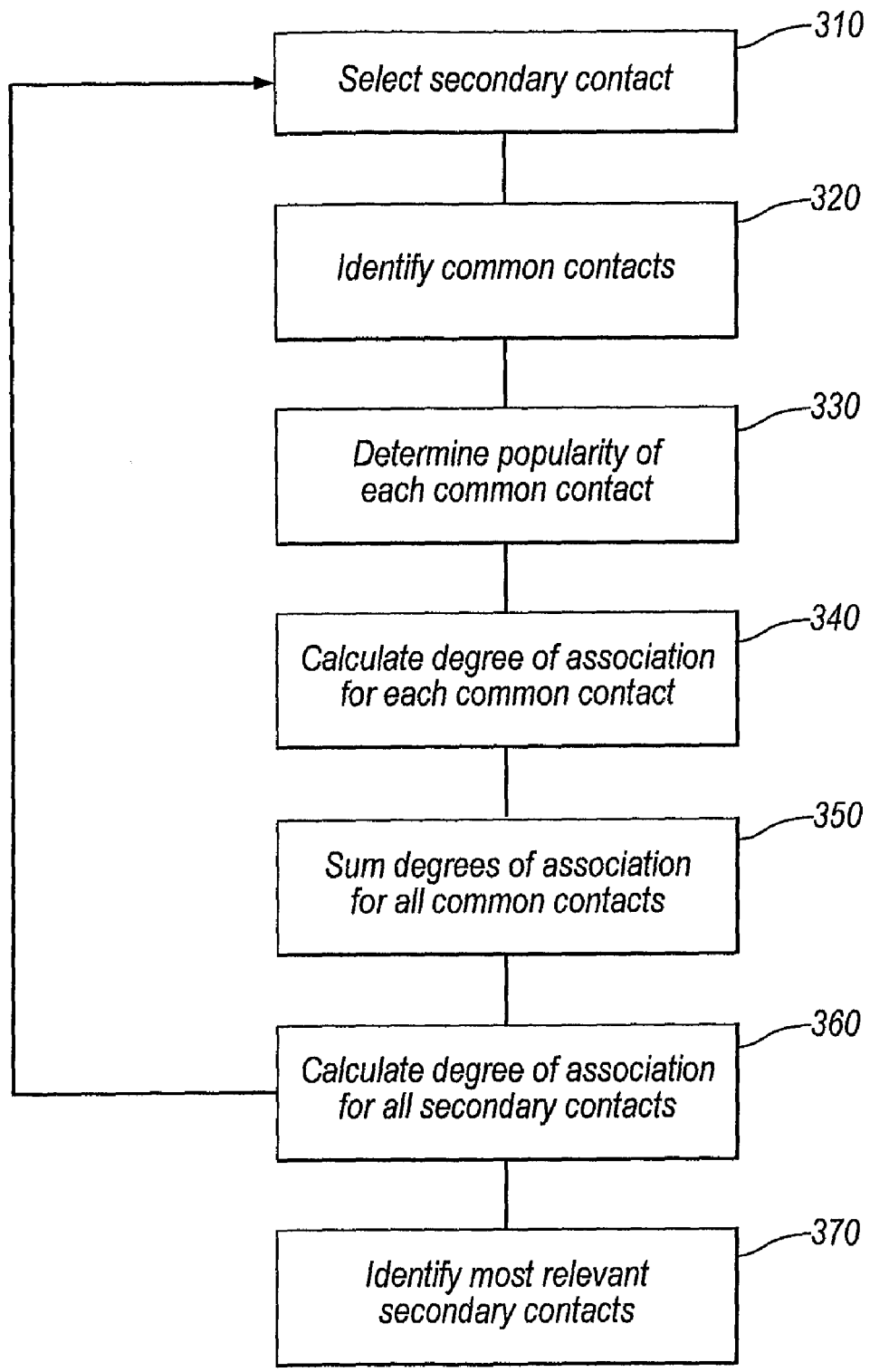
FIG. 3 shows the steps taken to calculate the communication association between two subscribers taking into account popularity of the common contacts.

Referring now to FIG. 3, the system starts by selecting a secondary contact at 310. The system then finds all contacts of the secondary contacts in the same manner as that describer above in relation to the suspect and primary subscriber and identifies all common contacts between the suspect and that secondary contact at 320. Further embodiments may specifically only check for the primary contacts of the suspect within the call record of the secondary contact rather than finding all contacts and identifying the common contacts from them. At 330 the system determines the popularity of each common contact by determining how many subscribers have communicated with that common contact. The popularity of the common contact is determined by simply checking the call record for that subscriber and counting the number of contacts it has. At 340 the degree of association in respect of the common contact is calculated by dividing 10000 by the number of contacts of that common contact.

The total degree of association between the suspect and the selected secondary contact is calculated at 350 by summing the degree of association of each of the common contacts. Therefore, using the example of Table 1, the total degree of association between suspect A and subscriber H (having common contacts B and C) is the sum of the degrees of association of common contacts B and C=200+0.001=200.001. The total degree of association between A and J (having common contacts B, C, F and G) is the sum of the degrees of association of contacts B, C, F and G=200+0.001+2000+400=2600.001.

The total degree of association is calculated for the suspect with each of the secondary contacts at 350. Finally, at 360 the system identifies the secondary contacts which are most closely associated with the suspect A by having the highest total degree of association. In the example of table 1, there is a higher association between A and J than A and H.

Figure 4:
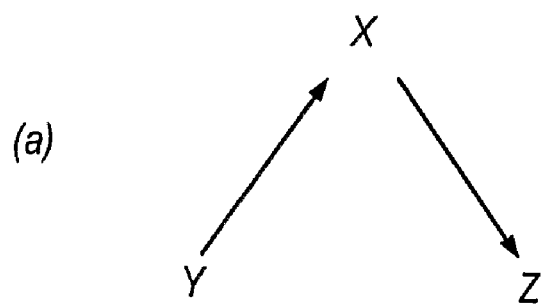
FIG. 4 shows the direction of communications between subscribers.
Figure 4:
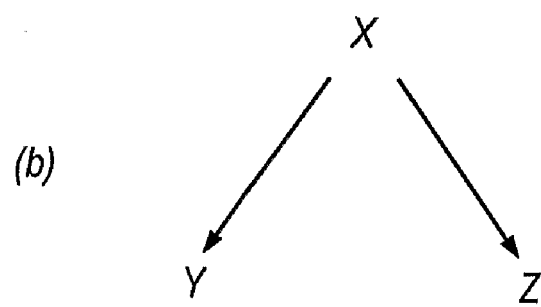
Figure 4:
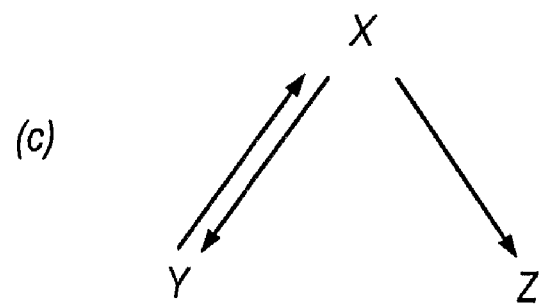
Figure 5:
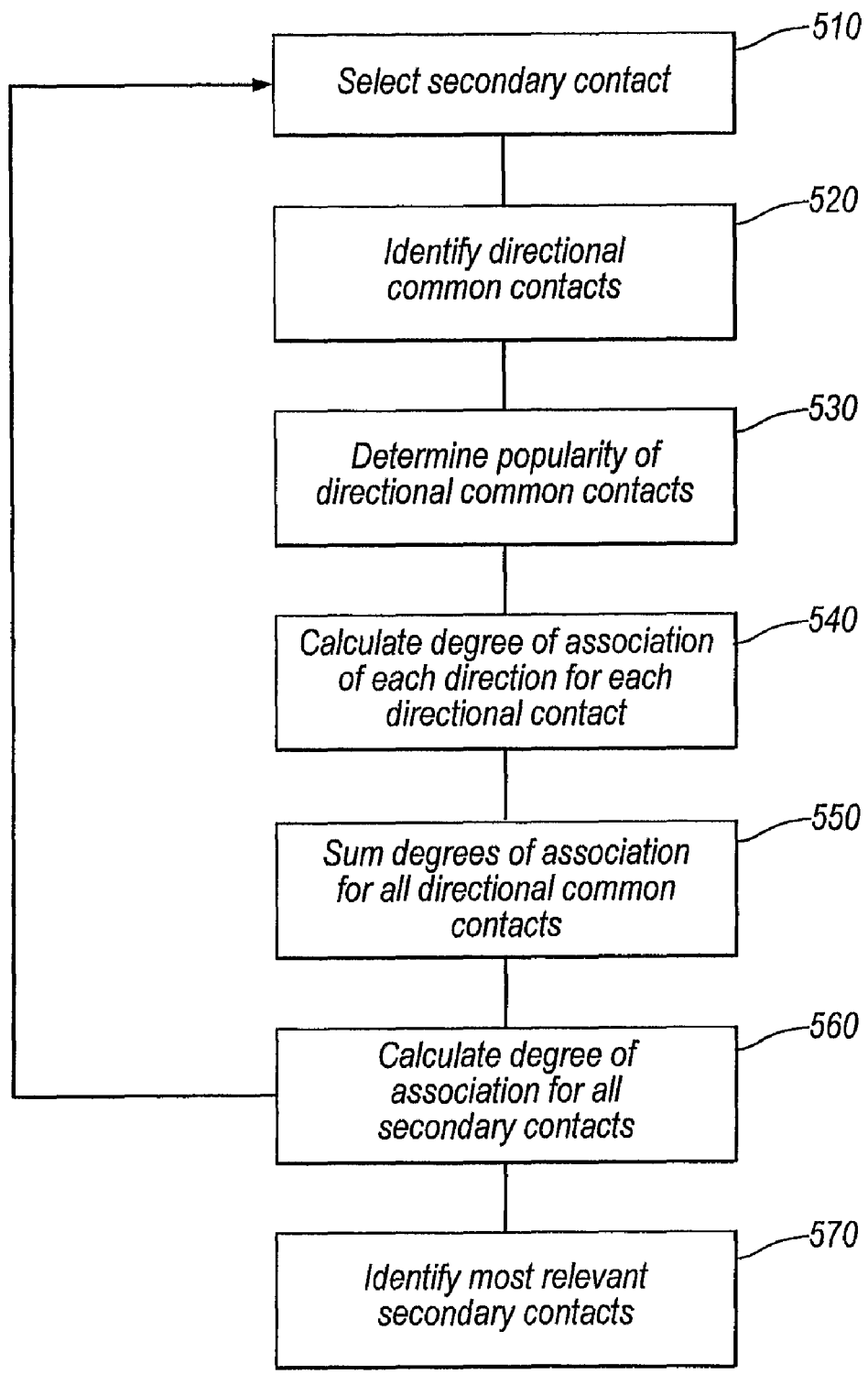
FIG. 5 shows the steps taken to calculate association between two subscribers and takes into account the direction of communications with common contacts.
Figure 6:
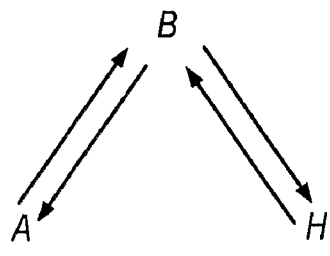
FIG. 6 shows the direction of communications between subscribers and common contacts.
Figure 6:
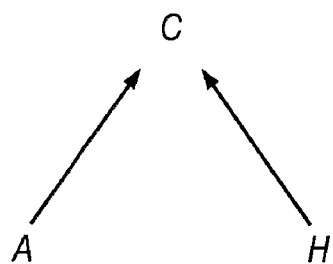
Figure 6:
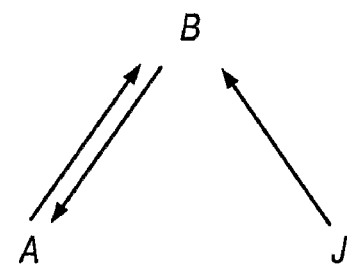
Figure 6:
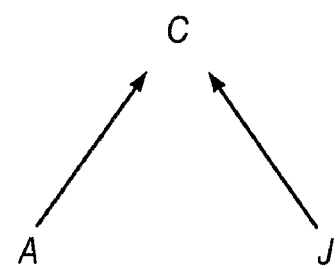
Figure 6:
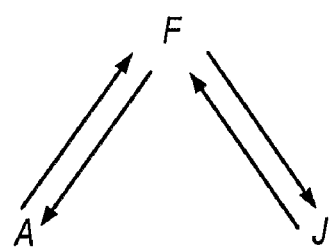
Figure 6:
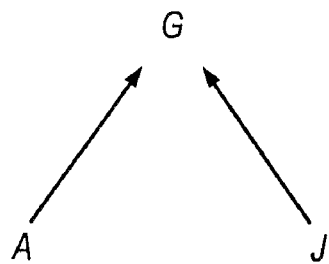

In a further embodiment of the invention the direction of communications is also taken into account. FIG. 5 shows the analysis steps performed by such embodiments. In the embodiment of FIG. 5, a contact is only considered to be a common contact if a secondary contact and a suspect both communicate with the common contact in the same way. Examples of communication directions are shown in FIG. 4. In FIG. 4a, a suspect Y and a secondary contact Z have both communicated with X. Y has only initiated communications with X and not received a communication from X. In contrast, Z has received communications from X but not initiated communications with X. Therefore, Y and Z do not show the same communication activity with X and so X is not considered to be a common contact for the purposes of determining the association between Y and Z. In contrast, in FIG. 4b, both Y and Z have received communications from X. Therefore, X is considered a common contact for initiating calls to Y and Z. Finally, in FIG. 4c, X has initiated and received communications from Y and initiated communications with Z. Therefore, X is considered a common contact only for initiating calls with Y and Z.

In order to assess the degree of association due to these directional common contacts, the number of contacts that the common contact has in a particular direction (i.e. initiate or receive) are taken into account.

Referring now to FIG. 5, at 510 the secondary contact is selected. At 520 the system identifies directional common contacts between the suspect and the secondary contact. At 530 the system then determines how many contacts the common contact has in the common direction, i.e. how many contacts did it initiate communication with and how many contacts did it receive communications from. At 540 the degree of association of each direction is calculated separately by dividing an arbitrary number by the number of relevant contacts.

At 550 the degree of association between the suspect and secondary contact is calculated by summing the relevant degrees of association of directional common contacts. In the case that both subscribers initiate and receive a communication from a common subscriber the degrees of association related to receipt and initiation with that common contact are included in the sum to determine the total degree of association.

Once the association level has been calculated for all secondary contacts at 560, the most highly associated secondary contacts to the suspect are identified at 570. These contacts have the most similar communication profiles to the suspect.

A more detailed version of the data of Table 1 is shown in Table 2 and shows the directional contacts of each subscriber. The total number of contacts of each common contact is split up into the number of contacts which initiate and receive communications from the common contact. The total number of contacts is not always the sum of separate contacts received and initiated since certain contacts will both receive and initiate communications with the common contacts and so will appear in both columns. In the example of common contact F, only 5 contacts both initiated and received communications from F. Therefore, any subscribers who share F as a common contact are likely to be closely associated. In the example of common contact G, while 25 subscribers received communications from G, only 2 initiated communications with G. Therefore, the association between the two subscribers who initiate communications with G is more relevant than the association between two of the 25 subscribers who receive communications from G. This is reflected in the degree of association of 5000 for contacts initiating communications with G compared with 40 for those who receive communications from G.

TABLE 2

Degree of association between subscribers sharing common contacts.

| Common Contact | Total No. Contacts | No. Contacts (received comms) | No. Contacts (initiated comms) | Degree of Association of subscribers sharing directional common contact |
|---|---|---|---|---|
| B | 50 | 40 | | 250 |
| | | | 40 | 250 |
| C | 10000000 | 10000000 | | 0.001 |
| | | | 0 | |
| F | 5 | 5 | | 2000 |
| | | | 5 | 2000 |
| G | 25 | 25 | | 40 |
| | | | 2 | 5000 |

We now refer to FIG. 6a which shows the direction of calls between subscribers A and H and their common contacts and FIG. 6b which shows the direction of calls between subscribers A and J and their common contacts. The degrees of association from Table 2 are used to calculate the degree of association of J and H with A.

For A and H: both A and H initiate and receive communications from B and initiate communications with C. Therefore, the total degree of association between A and H is 250+250+0.001=500.001.

For A and J: both A and J initiate communications with B. Although B also initiates communication with A this is not a common directional contact with J since B does not initiate communication with J. Therefore, the degree of association due to calls initiated by B is not considered in the association between A and J. Both A and J initiate communications with C, initiate and receive from F and initiate with G. Therefore, the total degree of association between A and G is 250+0.001+2000+2000+40=4290.001.

In this example the association between A and J is higher than that between A and H.

In further embodiments of the invention the system may give some association weighting to a common contact in which the direction of communication with the suspect and secondary contact differs. However, this will be lower than the weighting between a suspect and a secondary contact which share the same direction of communication with the common contact.

One way in which data processing can be reduced is by ignoring very popular primary contacts which are unlikely to provide any useful association data. Therefore, in preferred embodiments of the invention, primary contacts with more than a predefined number of contacts are ignored. For example, if a primary contact has many thousand contacts (for example in the case that the primary contact is the number for voicemail), all secondary contacts via that primary contact (i.e. all subscribers who have communicated with that primary contact) are not identified. This reduces the computational burden for the common contact identification between the suspect and secondary contact.

The association data is useful in a number of ways. One application is to identify subscribers that are associated with a suspected fraudulent user. For example, if a subscriber is suspected or known to be committing fraud, that subscriber takes the position of the 'suspect' as identified above. By executing an association profile as described above, those secondary contacts who display the closest association to the suspected fraudulent user are identified. Those secondary contacts are likely to be associated with the suspect in some way, for example they may be the same individual using a different account or a close associate. Thus, investigations into the closely associated secondary contacts can be made. Such associations can be particularly helpful if one of the secondary contacts is a land line or other legitimately registered account. In this case, the identity and address of a close associate can be identified which may help to determine the true identity of the fraud.

Another way in which the data can be used is by storing user profiles for suspect or known fraudulent users. The user profiles of different subscribers can then be compared to identify links between suspected fraudulent users. This use of the data is most valuable in cases when a fraudulent user is identified or has ceased to use one account and might use a different fraudulently obtained account in the future. The system is able to compare the profile of the known fraudulent user with current subscribers to try to identify user profiles which are current and are similar to the known fraudulent user's profile. Such profiles could correspond to the same user operating as a new subscriber. Such operations would enable the fraudulent user's new activity to be detected at an early stage.

A common occurrence is that a fraudulent user uses one account for a while and then stops using that account, perhaps because it has been barred by the network, and commences using a new account. One way in which the system can be used to identify potential accounts that the fraudulent user is currently using is to look for associations over different time periods. For example, the system can identify all primary contacts during a time period in which the user was using a first device fraudulently. The system can then look for secondary contacts who have communicated with a primary user during a different time period, for example more recently. Thus, the time at which the suspect and secondary contacts communicated with the common contacts is taken into account. If any of those secondary contacts show a high similarity with the suspect's profile from an earlier time period, it is likely that at least one of those secondary contacts could be the same fraudulent user operating at the present time.

For example, if an account was identified as being fraudulent and was terminated six months ago, the system could use the fraudulent account as the suspect account and determine all primary contacts of that account during the activity period of that account, for example from 12 months ago to six months ago. In order to determine whether that activity is similar to any subscribers which are currently active, the system might investigate the activity of secondary contacts over a recent time period, for example the last six months. The system could then identify common contacts which communicated with the secondary subscribers during the recent time period and which communicated with the suspect during the activity period of its account. Thus, it is possible to compare current subscriber activity with that of a fraudulent subscriber who was using his account some time ago.

A further use of the user profiling is to identify profile clustering. Here, the interactivity between known fraudulent users can be monitored. This can produce information relating to the identity of individuals within the cluster if one of the subscribers is identified as, or identified to be closely associated with, a legitimate subscriber.

Further embodiments of the invention monitor IMEI and SIM association and pairings. In such embodiments the IMEIs and SIMs used by suspected users are compared with those used by other subscribers. In this way, it is possible to track where, for example, a number of SIMs have been used in a device which has been used fraudulently, or a number of devices have been associated with a fraudulent use. This can also be used to identify SIMs or IMEIs which are likely to be being used fraudulently if there are links from those SIMs or IMEIs to other fraudulent activity. Such links can be very meaningful in fraud detection since they suggest physical interaction between parties.

Typically, when making or receiving a communication on a mobile communication device, details of the communicating parties' Subscriber Identity Module (SIM) and device are provided to the network. Each SIM has a unique International Mobile Subscriber Identity (IMSI) which is registered to the subscriber and this is passed to the network when the SIM is involved in a communication. Additionally, the mobile device itself has an identifier, the International Mobile Equipment Identity (IMEI), which is associated with the specific device. In principle, each device should have a unique IMEI. However, in practice, an IMEI may be common to more than one device. Typically, the IMEI is also provided to the network when a device is involved in a communication. Thus, in any communication, a network is able to identify the device and SIM used by each party during the communication. This information is stored by the network.

One way in which networks could use the IMSI and IMEI information is to prevent communications being made on stolen SIMs or devices. If a device and/or SIM is reported stolen, a network could blacklist the relevant IMSI and IMEI. If the network identifies that a party is attempting to communicate using that IMSI or IMEI, the communication is terminated.

Figure 7:
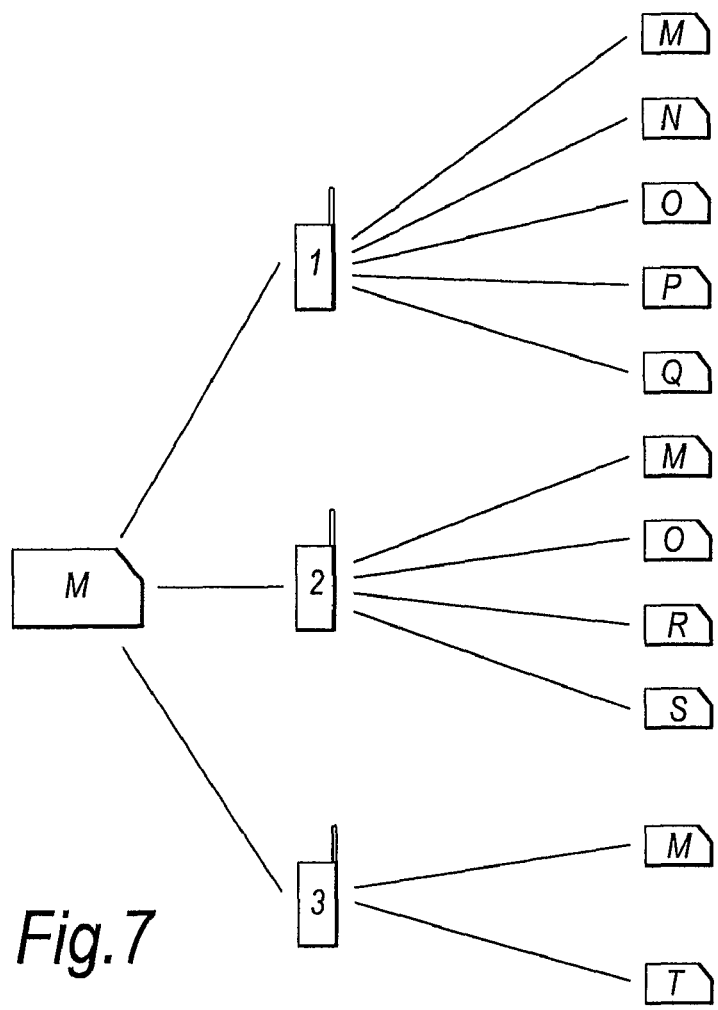
FIG. 7 shows the physical interactions between SIMs and devices.
Figure 8:
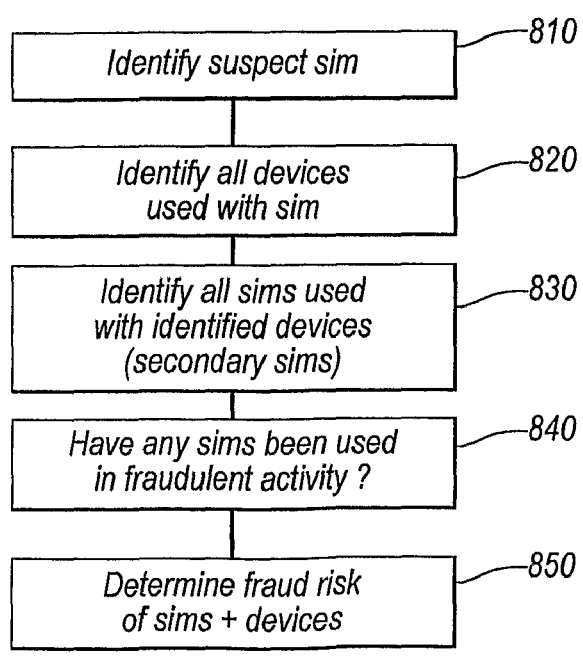
FIG. 8 shows the steps taken to identify physical interactions between subscribers.

Various embodiments of the system described herein use IMSI and IMEI associations to track the physical use of SIMs and devices in order to identify associations between accounts. FIGS. 7 and 8 show the steps taken by such embodiments.

At 810 the system identifies a suspect SIM. The system then interrogates a call records database to identify all devices with which the SIM has been used during communications at 820. This search may be made over a predefined time period, for example the past 6 months. The system interrogates the database by identifying all instances when the IMSI has been used in communications and retrieves the IMEIs of the devices which have been used with the IMSI during those communications. In the example of FIG. 7, the system has looked for any devices used with SIM M. The system has identified that SIM M has been used with devices 1, 2 and 3.

The system then looks for any SIMs which have been used with identified devices 1, 2 and 3 at 830 by looking for IMSIs which have been used with the IMEIs of the devices during communication. These SIMs are referred to as secondary SIMs In the example of FIG. 7 secondary SIMs M, N, O, P, Q, have been used with device 1; secondary SIMs M, O, R and S have been used with device 2 and secondary SIMs M and T have been used with device 3.

Since SIMs and devices must, typically, be co-located in order to engage in network communication, FIG. 7 implies that there must be physical interaction between the devices and the SIMs and this can help to make further investigations into the fraudulent activity. For example, if SIM T has already been identified as a fraudulent account, there is a chance that device 3 is in the hands of a fraudulent user and the network may wish to shut down use of this device by blacklisting its IMEI.

Various embodiments take the investigation a step further and identify all devices which have been used with the secondary SIMs.

Embodiments such as that described with reference to FIGS. 7 and 8 enable fraud risk analysts to identify physical associations between devices and SIMs. This can be helpful in identifying physical connections between fraudulent accounts. This can be particularly helpful in highlighting high risk accounts at an early stage. Thus, if a SIM or a device is identified as being fraudulent, embodiments of the invention enable an analyst to identify other SIMs or devices which are physically associated with that fraudulent SIM or device. At 840 the system determines whether any of the secondary SIMs or devices have been confirmed as being involved in fraudulent activity. At 850, the system is able to assess the risk of fraud associated with the other devices, secondary SIMs or SIM M based on whether any of the other devices or SIMs have been engaged in fraudulent activity previously.

For example, if a device has been used with one or more accounts/SIMs which are confirmed as fraudulent, that device could be marked as a high risk device, indicating that there is a high risk that other accounts which are used with that device are also fraudulent. On identification of such high risk accounts, the network operator may request that the account holders provide additional personal information before allowing further use of the account/SIM. Thus, the network operator has an opportunity to identify legitimate or fraudulent users by investigating the physical associations between SIMs and devices.

Geographical information obtained from call data can also be useful in identifying the location of fraudulent users and also to add weighting to the associations. For example, if two subscribers show very similar call behaviour during the same time period but are located in distant locations, it may be deduced that they are not being used by the same individual. However, there may still be an association between the subscribers.

It will be clear to those skilled in the art that embodiments of the present invention are able to detect similarities in the communication profiles of subscribers of communication networks. These similarities can be used to associate subscribers having similar communication habits. If a subscriber is recognised as a known fraudulent user, by monitoring his communication profile it is possible to identify whether the user or a close associate is operating further accounts or devices. Once the further account is identified, the information can be used to prevent further fraudulent use by, for example, shutting down the subscriber SIM or the information can be used to establish the identity of the fraudulent user.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

The invention claimed is:

1. A method for identifying subscribers to a communication network involved in potentially fraudulent activities, comprising:
   selecting a first subscriber, the first subscriber identified as being, at least potentially, involved in fraudulent activities;
   identifying at least one primary contact of the first subscriber, each primary contact having communicated with the first subscriber;
   identifying at least one secondary contact of the first subscriber, each secondary contact having communicated with a primary contact;
   for each secondary contact, identifying any common contacts with the first subscriber, common contacts having communicated with the first subscriber and the secondary contact; and
   for each secondary contact, determining a degree of association with the first subscriber by:
      determining a measure of significance of each common contact; and
      determining the degree of association by combining the measure of significance for each of the secondary contact's common contacts; and
   using the determined degrees of association to identify subscribers involved in potentially fraudulent activities.

2. A method according to claim 1 wherein a common contact shares the same communication initiation direction with both a secondary contact and the first subscriber.

3. A method according to claim 1, further comprising:
   determining the number of contacts of each common contact, the common contact having communicated with each of the contacts, wherein the significance of the common contact is determined in dependence on the number of contacts of the common contact.

4. A method according to claim 3 wherein common contacts with fewer contacts are more significant than common contacts with a greater number of contacts.

5. A method according to claim 1, wherein each identified common contact communicated with:
   the first subscriber during a first time period; and
   at least one of the secondary contacts during a secondary time period.

6. A method according to claim 5, wherein the first time period is earlier than the second time period.

7. A method for determining associations between subscribers of a communication network, comprising:
   selecting a first subscriber;
   identifying at least one primary contact of the first subscriber, each primary contact having communicated with the first subscriber;
   identifying at least one secondary contact of the first subscriber, each secondary contact having communicated with a primary contact;
   for at least one secondary contact, identifying at least one common contact of the first subscriber and the secondary contact, common contacts having communicated with the first subscriber and the secondary contact;
   determining the significance of the at least one common contact; and
   determining an association between the first subscriber and the secondary contact in dependence on the significance of the at least one common contacts, wherein the common contacts communicated with the first subscriber during a first time period and the common contacts communicated with the secondary contacts during a second time period.

8. A method for determining associations between subscribers of a communication network according to claim 7 wherein the first time period is earlier than the second time period.

9. An apparatus for identifying subscribers of a communication network that are involved in potentially fraudulent activities, comprising:

a selector that selects a first subscriber, the first subscriber identified as being, at least potentially, involved in fraudulent activities;

a primary contact identifier that identifies at least one primary contact of the first subscriber, each primary contact having communicated with the first subscriber;

a secondary contact identifier that identifies at least one secondary contact of the first subscriber, each secondary contact having communicated with a primary contact;

for each secondary contact, a common contact identifier that identifies any common contacts with the first subscriber, common contacts having communicated with the first subscriber and the secondary contact;

for each secondary contact, an association determiner that determines a degree of association with the first subscriber by:

determining a measure of significant of each common contact; and determining the degree of association by combining the measures of significance for each of the secondary contact's common contacts; and a fraudulent activity identifier that uses the determined degrees of association to identify subscribers involved in potentially fraudulent activities.

10. An apparatus according to claim 9 wherein a common contact shares the same communication initiation direction with both a secondary contact and the first subscriber.

11. An apparatus according to claim 9, further comprising:

a popularity determiner for determining the number of contacts of each common contact, the common contact having communicated with each of the contacts, wherein the significance of the common contact is determined in dependence on the number of contacts of the common contact.

12. An apparatus according to claim 11 wherein common contacts with fewer contacts are more significant than common contacts with a greater number of contacts.

13. An apparatus according to claim 9, wherein each identified common contact communicated with:

the first subscriber during a first time period; and at least one of the secondary contacts during a second time period.

14. An apparatus according to claim 13, wherein the first time period is earlier than the second time period.

15. An apparatus for determining associations between subscribers of a communication network, comprising:

a selector that selects a first subscriber;

a primary contact identifier that identifies at least one primary contact of the first subscriber, each primary contact having communicated with the first subscriber;

a secondary contact identifier that identifies at least one secondary contact of the first subscriber, each secondary contact having communicated with a primary contact;

for at least one secondary contact, a common contact identifier that identifies at least one common contact of the first subscriber and the secondary contact, common contacts having communicated with the first subscriber and the secondary contact;

a significance determiner that determines the significance of the at least one common contacts; and an association determiner that determines an association between the first subscriber and the secondary contact in dependence on the significance of the at least one common contact, wherein common contacts communicated with the first subscriber during a first time period and common contact communicated with the secondary contacts during a second time period.

16. An apparatus for determining associations between subscribers of a communication network according to claim 15 wherein the first time period is earlier than the second time period.

17. A method for determining physical associations between subscribers of a communication network, comprising:

selecting a first subscriber;

identifying all devices used by the selected first subscriber during at least one communication, such devices being primary devices;

identifying all subscribers which have used the primary devices during at least one communication, such subscribers being secondary subscribers;

determining a physical association between first subscriber and secondary subscribers by:

for at least one of the secondary subscribers, identifying any common primary devices with the first subscriber, common primary devices having been used by the first subscriber and the at least one secondary subscriber; and for the at least one secondary subscriber, determining a degree of physical association with the first subscriber by:

determining a measure of significance of each common primary device; and determining the degree of physical association by combining the measure of significance for the at least one secondary subscriber's common primary devices; and identifying, using the determined degree of physical association, whether any of the first or secondary subscribers have been involved in fraudulent activity.

18. A method for determining physical associations between subscribers of a communication network according to claim 17, further comprising:

assessing the risk of fraudulent activity by first or secondary subscriber in dependence on the identification of fraudulent activity from other first or secondary subscribers.

19. A method for determining physical associations between subscribers of a communication network according to claim 17, wherein subscribers are identified by allocated international Mobile Subscriber Identifiers (IMSI).

20. A method for determining physical associations between subscribers of a communication network according to claim 17, wherein devices are identified by IMEI.

21. An apparatus for determining physical associations between subscribers of a communication network, comprising:

a selector that selects a first subscriber;

a device identifier that identifies all devices used by the selected first subscriber during at least one communication, such devices being primary devices;

a subscriber identifier that identifies all subscribers which have used the primary devices during at least one communication, such subscribers being secondary subscribers;

a determiner that determines a physical association between first subscriber and secondary subscribers by:

for at least one of the secondary subscribers, identifying any common primary devices with the first subscriber, common primary devices having been used by the first subscriber and the at least one secondary subscriber; and for the at least one secondary subscriber, determining a degree of physical association with the first subscriber by:
   determining a measure of significance of each common primary device; and
   determining the degree of physical association by combining the measure of significance for the at least one secondary subscriber's common primary devices; and
a fraudulent activity identifier that identifies, using the determined degree of physical association, whether any of the first or secondary subscribers have been involved in fraudulent activity.

22. An apparatus for determining physical associations between subscribers of a communication network according to claim 21, further comprising:

an assessor that assesses the risk of fraudulent activity by first or secondary subscriber in dependence on the identification of fraudulent activity from other first or secondary subscribers.

23. An apparatus for determining physical associations between subscribers of a communication network according to claim 21, wherein subscribers are identified by allocated international Mobile Subscriber Identifiers (IMSI).

24. An apparatus for determining physical associations between subscribers of a communication network according to claim 21, wherein devices are identified by IMEI.

* * * * *